(12) United States Patent
Hendrickson et al.

(10) Patent No.: US 7,374,057 B2
(45) Date of Patent: May 20, 2008

(54) ELECTRICAL JUNCTION ASSEMBLIES FOR COUPLING ELECTRICAL FIXTURES TO SUSPENDED CEILING GRIDS

(75) Inventors: Brian S. Hendrickson, Menlo Park, CA (US); Walter Blue Clark, Palo Alto, CA (US)

(73) Assignee: Finelite, Union City, CA (US)

( * ) Notice: Subject to any disclaimer, the term of this patent is extended or adjusted under 35 U.S.C. 154(b) by 231 days.

(21) Appl. No.: 11/077,690

(22) Filed: Mar. 10, 2005

(65) Prior Publication Data
US 2005/0211706 A1 Sep. 29, 2005

Related U.S. Application Data

(60) Provisional application No. 60/552,464, filed on Mar. 11, 2004.

(51) Int. Cl.
*H02G 3/08* (2006.01)

(52) U.S. Cl. .................. 220/3.8; 220/3.9; 220/3.2; 220/4.01; 220/4.02; 248/906; 174/50

(58) Field of Classification Search ............... 220/3.9, 220/3.8, 3.3, 4.02; 206/464; 248/906, 317; 174/50.51, 50.5
See application file for complete search history.

(56) References Cited

U.S. PATENT DOCUMENTS

| | | | | |
|---|---|---|---|---|
| 3,599,921 A * | 8/1971 | Cumber | | 248/317 |
| 3,612,461 A * | 10/1971 | Brown | | 248/317 |
| 3,843,086 A * | 10/1974 | Ptak | | 248/317 |
| 3,852,514 A | 12/1974 | Lauben | | 174/58 |
| 3,863,037 A * | 1/1975 | Schindler et al. | | 174/58 |
| RE28,489 E * | 7/1975 | Schindler et al. | | 174/58 |
| 4,050,603 A * | 9/1977 | Harris et al. | | 220/3.9 |
| D280,696 S | 9/1985 | Hunter | | D8/373 |
| 4,549,375 A | 10/1985 | Nassof | | 52/39 |
| 4,583,340 A | 4/1986 | Sauer | | 52/484 |
| D288,171 S | 2/1987 | Dey | | D8/373 |
| 4,723,749 A * | 2/1988 | Carraro et al. | | 248/317 |
| 4,905,952 A | 3/1990 | Pinquist | | 348/317 |
| 4,993,670 A | 2/1991 | Tesar | | 248/68 |
| 5,484,076 A * | 1/1996 | Petrushka | | 220/3.9 |
| 5,557,902 A | 9/1996 | Witmyer | | 52/506.07 |
| 5,758,465 A | 6/1998 | Logue | | 52/506.06 |
| 5,957,574 A * | 9/1999 | Hentz et al. | | 362/365 |
| 6,050,534 A | 4/2000 | Andrews | | 248/317 |
| 6,341,466 B1 * | 1/2002 | Kehoe et al. | | 52/712 |
| 6,345,800 B1 * | 2/2002 | Herst et al. | | 248/342 |
| 6,360,507 B1 * | 3/2002 | Nevers et al. | | 52/506.07 |
| 6,384,334 B1 * | 5/2002 | Webb | | 174/58 |

(Continued)

*Primary Examiner*—Anthony Stashick
*Assistant Examiner*—Christopher McKinley
(74) *Attorney, Agent, or Firm*—Jag Patent Services

(57) ABSTRACT

A T-bar clip assembly that securely couples to T-bar structures that are used to construct suspended ceiling is disclosed. The T-bar assembly is configured to support one or more electrical fixtures and provide power feeds to the one or more electrical fixtures. The T-bar clip assembly comprises support brackets that secure to the T-bar structures and one or more housing structures that attach to a portion of the support brackets to form one or more corresponding junction box enclosures. The junction box enclosures provide the power feeds to the one or more electrical fixtures at locations that are substantially flush with support flanges of the T-bar structure, an outer surface of the removable ceiling tiles or both.

20 Claims, 10 Drawing Sheets

U.S. PATENT DOCUMENTS 6,464,179 B1 * 10/2002 Bulvan et al. ................ 248/58
6,491,270 B1 * 12/2002 Pfaller .................... 248/200.1
6,637,710 B2    10/2003 Yaphe et al. ................ 248/317
6,761,341 B2 *  7/2004 Pfaller .................... 248/200.1

* cited by examiner

ELECTRICAL JUNCTION ASSEMBLIES FOR COUPLING ELECTRICAL FIXTURES TO SUSPENDED CEILING GRIDS

RELATED APPLICATION(S)

This application claims priority under 35 U.S.C. § 119(e) from the U.S. provisional patent application Ser. No. 60/552,464, filed on Mar. 11, 2004, and titled "INTEGRATED TEE BAR CLIP AND ELECTRICAL SPLICE COMPARTMENT." The provisional patent application Ser. No. 60/552,464, filed on Mar. 11, 2004, and titled "INTEGRATED TEE BAR CLIP AND ELECTRICAL SPLICE COMPARTMENT" is hereby incorporated by reference.

FIELD OF THE INVENTION

The invention relates to systems, devices for and methods of mounting and electrically coupling electrical fixtures to ceiling structures. More particularly, the present invention relates to systems, management systems, and devices for and methods of mounting and electrically coupling fixtures to suspended ceiling grids.

BACKGROUND OF THE INVENTION

Modem offices and schools often employ false, drop or suspended ceilings. A Suspended ceiling includes a grid of T-bar structures that support removable ceiling tiles. The T-bar structures are typically secured to a stable building structure, such as an I-beam, a fixed ceiling or a wall through wires that support the weight-bearing load of the T-bars and the removable ceiling tiles. The T-bar structures also provide locations for securing mounting assemblies that cans be used to suspend electrical fixtures.

Typically mounting assemblies that attach to T-bar structures are also typically secured to a stable building structure to help distribute the weight bearing of an electrical fixture suspended

SUMMARY OF THE INVENTION

The present invention is directed to T-bar clip assemblies and methods. A T-bar clip assembly, in accordance with the embodiments of the invention, is configured to securely couple to a T-bar member with a vertical support structure and horizontal support flanges that can also be described as having a substantially T-shaped cross section. T-bar structures are installed in an inverted fashion construct grids that support removable ceilings that rest on the horizontal support flanges with the vertical support structures extending upwards and that recede into the outer surface of the suspended ceiling.

A T-bar clip assembly is configured to support an electrical fixture, generally a light fixture, securely coupled to a T-bar structure. A T-bar clip assembly, in accordance with the embodiments of the invention, includes at least one junction box that has an aperture configured to receive and secure to a piece of standard flexible or rigid conduit with power lines. The junction box also is configured to provide at least one power feed directly out of the junction box to provide power to the electrical fixture supported therefrom. Preferably, the power feed is flush with an outer surface of a removable ceiling tile, an outer edge of the support flanges of the T-bar structure, or both, such that little no or insulating hardware is required above the removable ceiling tile in order to properly install the electrical fixture.

In accordance with the embodiments of the invention, a T-bar clip comprises support brackets that secure around a T-bar structure and one or more housing structures. Preferably, the one or more housing structures couple with at least one of the support brackets and together they form a junction box enclosure that is recessed above the suspended ceiling grid. The junction box enclosure provides a one or more locations for electrical connections and at least one power feed location out of the junction box that is substantially flush with support flanges of the T-bar structure.

DETAILED DESCRIPTION OF THE INVENTION

Figure 1A:
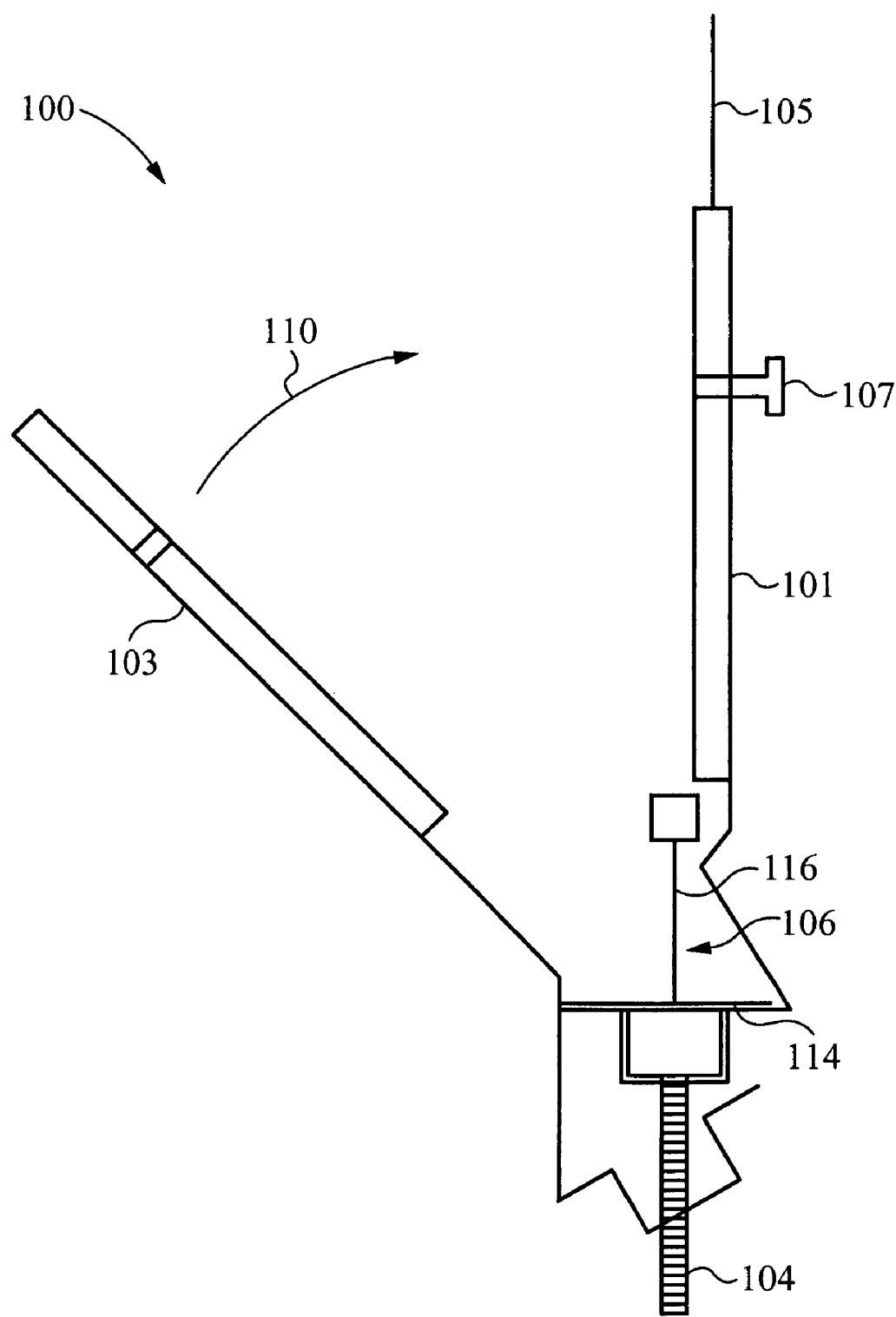
FIGS. 1A-B show schematic representations of a prior art T-bar clip assembly.

FIG. 1A shows side cross-sectional view of a prior art T-bar clip assembly 100 for mounting and suspending an electrical fixture (not shown) from a T-bar strcuture 106 that is used to form a T-bar grid that supports suspended ceiling tiles (not shown). The T-bar strcuture 106 has a vertical support 16 and horizontal flanges 114 for supporting removable ceiling tiles (not shown). The T-bar clip assembly 100 includes a first mounting bracket 101 and second mounting bracket 103 a that are clamped together and around the T-bar strcuture 106. A bolt feature 104 is attached to at least one of the first mounting bracket 101 and the second mounting bracket 103 therefrom.

Figure 1B:
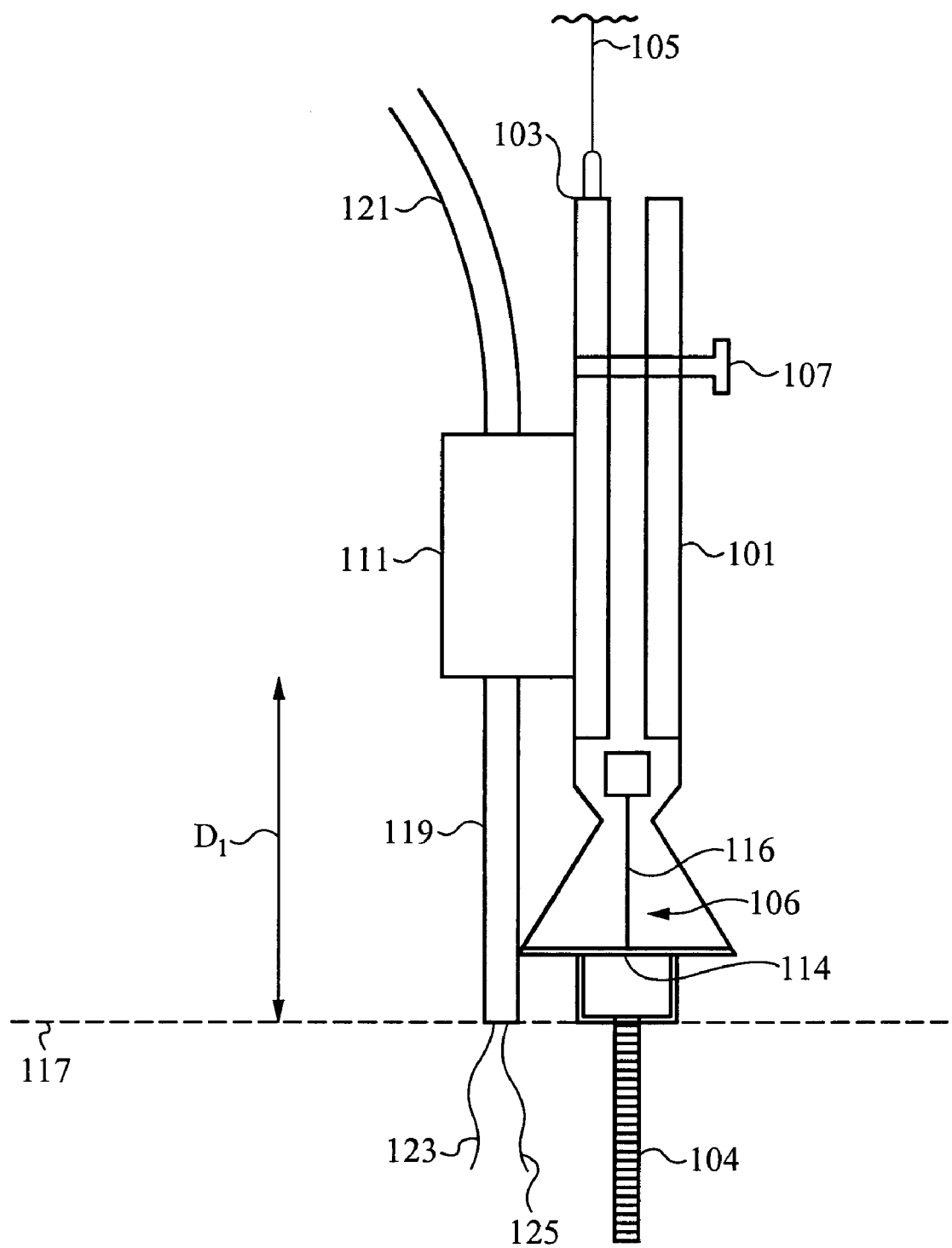

In order to install the T-bar clip assembly 100, the first mounting bracket 101 is fitted up to the T-bar structure 106. The second mounting bracket 103 is moved in a direction indicated by the arrow 110 to clamp around the T-bar structure 106, such as shown in FIG. 1B, and are secured together through a suitable clamping means 107. The first mounting bracket 101 and the second mounting bracket 103 are then securely held in position around the T-bar structure 106 using a bolt or any other suitable securing feature (not shown). A wire or other feature 105 can be attached to a top portion of the T-bar clip assembly 100. The wire or other support feature 105 is used to couple the T-bar clip assembly 100 to a stable building structure, such as an I-beam or a permanent ceiling, and to support the weight-bearing load of an electrical fixture attached to the T-bar clip assembly 100 through the bolt 104.

A T-bar clip assembly, such as the T-bar clip assembly 100 described above with reference to FIG. 1A and FIG. 1B, has several shortcomings. The T-bar clip assembly 100 is not adaptable for use with different-sized T-bars, such as T-bars having different heights and/or different widths. Further, the T-bar clip assembly 100 does not provide any features to support electrical connections 123 and 125 or wiring 121 required to power the electrical fixture attached to and supported from the T-bar clip assembly. A power feed location can be provided by vertically mounting a junction box 111 to one of the mounting brackets 101 and 103. However, typically only one junction box 111 can be mounted to the T-bar clip assembly 100. Further, the junction box 111 can not be mounted to the T-bar clip assembly 100 with the junction box 111 flush with a surface of a suspended ceiling as indicated by the dotted line 117. Accordingly, an insulator coupler or sleeve 119 must be installed to span the distance D1 between the junction box 111 and the surface of the suspended ceiling 117. Even when the T-bar clip assembly 100 is installed with the insulating coupler or sleeve 119, such installation of the T-bar clip assembly 100 may be not be acceptable or allowed by local or national electrical codes and regulations.

Figure 2:
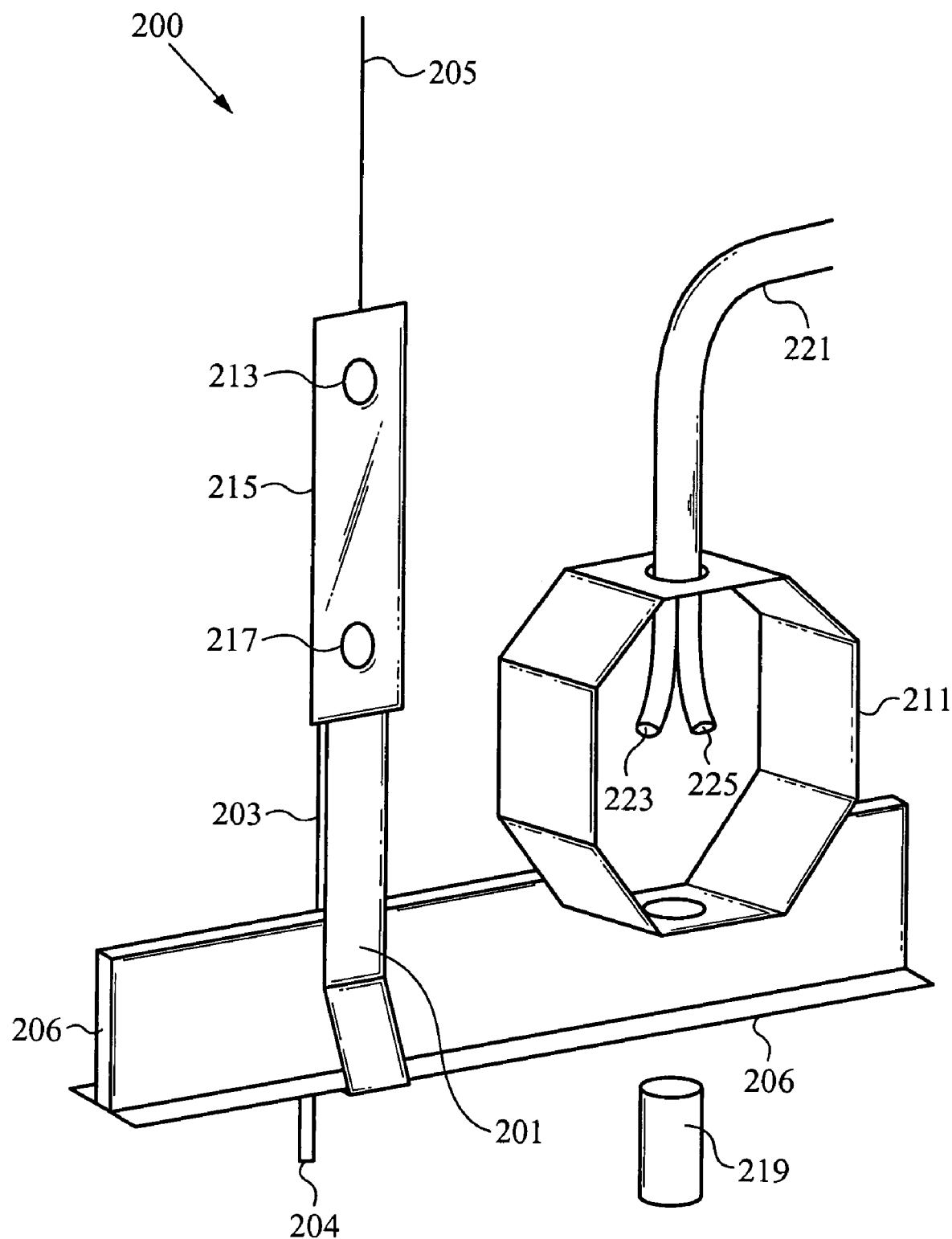
FIG. 2 shows a schematic representation of a prior art T-bar clip assembly with an adjustable bracket.

Bulvan et al. in U.S. Pat. No. 6,464,179 describes an improved T-bar clip assembly 200, illustrated in FIG. 2, for securing to a T-bar structure 206 that can then be used for mounting and suspending an electrical fixture from the T-bar structure 206, such as described above. The T-bar clip assembly 200 is more versatile than the T-bar clip assembly 100, described above, and is capable of securing to and clamping around a large range of sizes of T-bar. The T-bar clip assembly 200 includes a first mounting bracket 201 and a second mounting bracket 203 that secure around the T-bar structure 206. The first mounting bracket 201 and the second mounting bracket 203 are coupled to adjustable bracket 215 that is used to adjust the vertical position of the T-bar clip assembly 200. When the T-bar clip assembly 200 is installed, the adjustable bracket 215 is coupled to the T-bar clip assembly 200 through a bolt 204. A wire or other feature 205 can be attached to a top portion of the T-bar clip assembly 200 and support the weight-bearing load of an electrical fixture attached to the T-bar clip assembly 200. A power feed location can be provided by vertically mounting a junction box 211 to positions 213 and 217 on the adjustable bracket 215. Rigid or flexible conduit 221 with electrical lines 223 and 225 can be fed into the junction box 211 for hardwiring the electrical fixture. As with the T-bar clip assembly 100, only one junction box 111 can be mounted to the T-bar clip assembly 200 and because the junction box 211 cannot be mounted flush with a surface of a suspended ceiling, an insulator coupler or sleeve 219 must be installed to span the distance between the junction box 211 and the surface of the suspended ceiling. Accordingly, there is a need for a T-bar clip assembly that can be used for mounting and suspending an electrical fixture and that addresses the aforementioned shortcomings.

Figure 3:
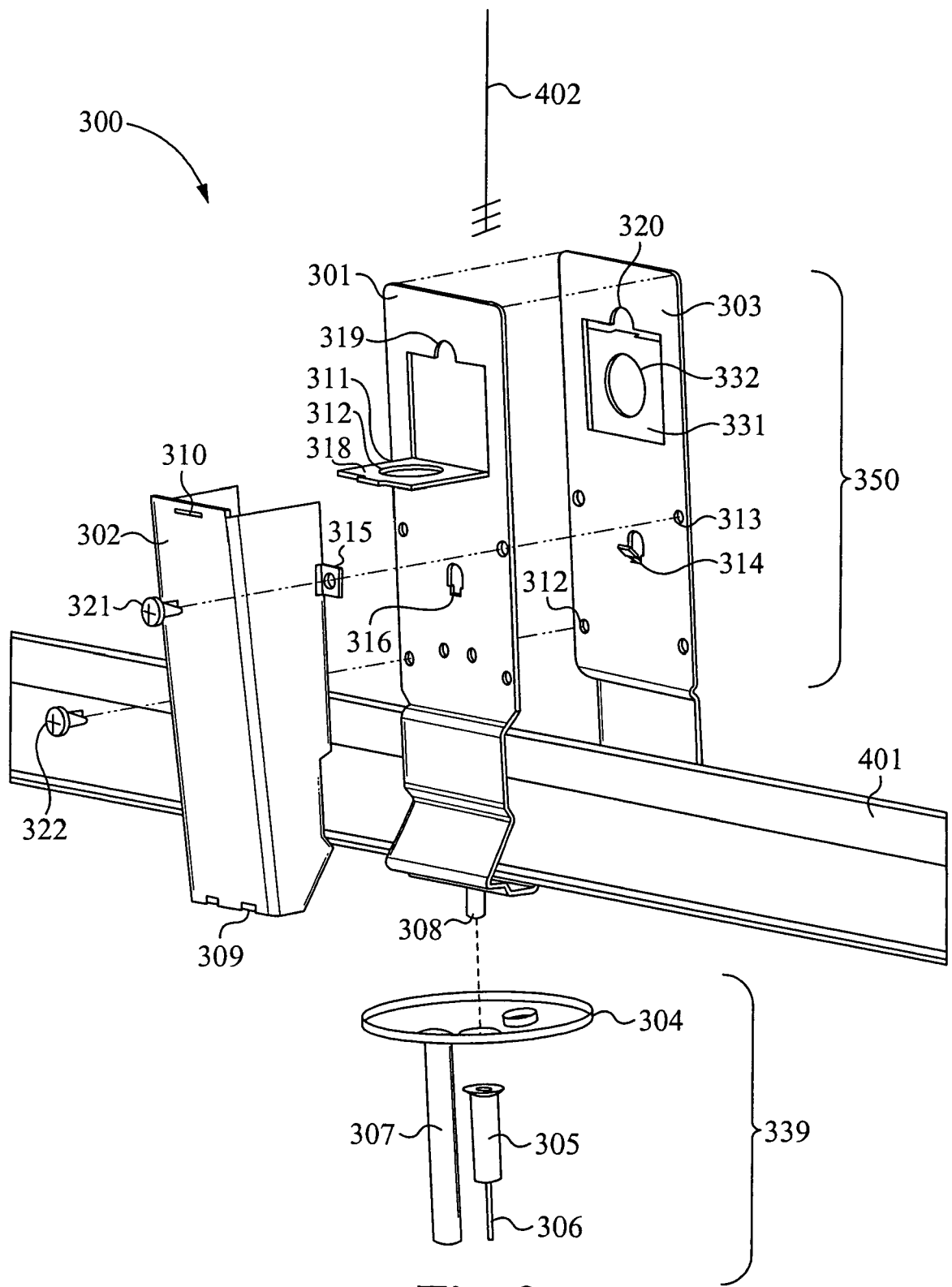
FIG. 3 is an exploded view of a T-bar clip assembly, in accordance with the embodiments of the invention.

FIG. 3 shows an exploded view of a T-bar clip assembly 300 in accordance with the embodiments of the invention. The T-bar clip assembly 300 includes support brackets 301 and 303 for securing around a T-bar structure 401 of a suspended ceiling grid to form a vertical housing support 350. The support bracket 301 can include a mounting aperture 316 that mates with a mounting tab 314 on the support bracket 303 for aligning the support brackets 301 and 303 in a position around the T-bar structure 401. After the support brackets 301 and 303 are aligned, the support brackets 301 and 303 can be secured together to the position around the T-bar structure 401 using screws 321 and 322 that are screwed through mounting apertures 312 and 313. It will be clear to one skilled in the art that the support brackets 301 and 303 can be secured togther and to the position around the T-bar structure 401 using any suitable securing means including, but not limited to, clips, nuts and bolts, geometric mating features and any combination thereof.

Figure 6:
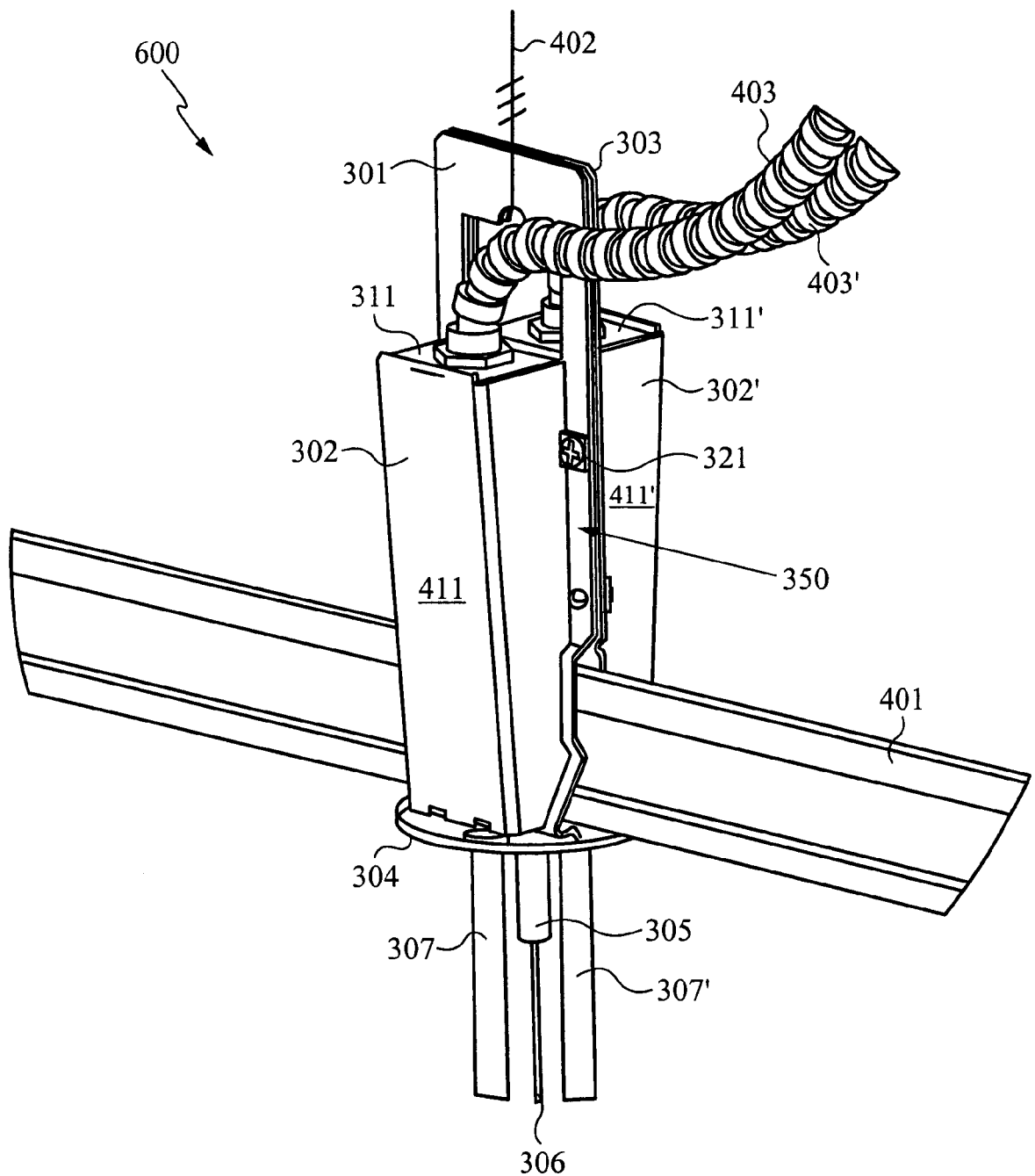
FIG. 6 shows a perspective view of a T-bar clip assembly for use with two power feed locations, in accordance with the embodiments of the present invention.

Still referring to FIG. 3, the support brackets 301 and 303 can include flanges 311 and 331 that can be folded or bent down from a retracted position, as shown with respect to the support bracket 303, to an extended position, as shown with respect to support bracket 301. The flanges 311 and 331 preferably have receiving apertures 312 and 332 or pop-out structures (not shown) that can be removed to provide the receiving apertures 312 and 332. The receiving apertures 312 and 332 are preferably sized to couple to flexible or rigid conduit, such as shown in FIG. 6, which provide power lines to power an electrical fixture or fixtures (not shown) coupled to the T-bar clip assembly 300. The support brackets 301 and 303 can also include means for securing to a building support. For example, the support brackets 301 and 303 have wire apertures 319 and 320 for receiving a wire 402 that can be attached to a building support structure.

In accordance with a preferred embodiment of the invention, the T-bar clip assembly 300 includes a housing structure 302 that is configured to couple to the vertical housing support 350 and from a junction box enclosure, such as shown in FIG. 6. In accordance with this embodiment of the invention, the flanges 311 form a top portion of the junction box enclosure when the housing structure 302 is attached to the vertical housing support 350. The housing structure 302 can be coupled to the vertical housing support 350 through one or more screws 321 and corresponding mounting tabs 315 and/or any other suitable means including, but not limited to, clips, nuts and bolts, geometric mating features and any combination thereof. The housing structure 302 can also include a slotted feature 310 that receives a matched flange tab 318 of the flange 311. With the housing structure 302 attached to the vertical housing support 350, at least one of the support brackets 301 and 303 and the resultant junction box enclosure provides a location for splices and electrical service connections to electrically couple the electrical fixture or fixture to the power lines and at least on power feed location from a bottom portion 309 of the housing structure 302.

At least one of the support brackets 301 and 303 preferably includes a stud structure 308, or any other attachment means, for coupling to a fixture hardware kit 339 and for supporting a light fixture. The fixture hardware kit 339 can include, for example, a canopy 304, that covers any exposed portions of the T-bar clip assembly 300, a sleeve 307, for receiving power lines from the junction box enclosure, and a bushing 305 with a support wire 306 that attaches to the stud structure 308 or other attachment means for supporting the weight bearing load of the light fixture.

Figure 4:
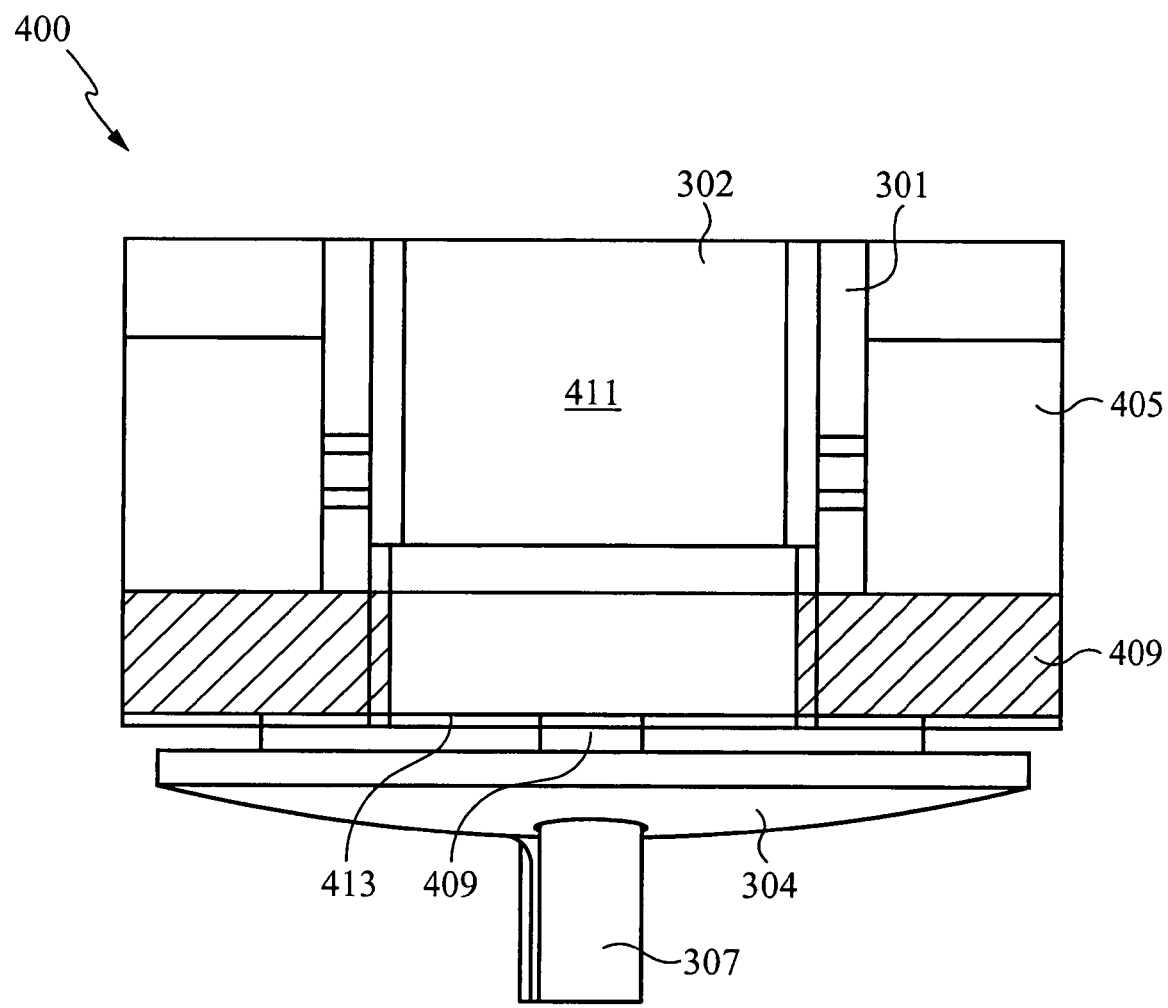
FIG. 4 shows a partial cross-sectional view of a T-bar clip assembly mounted flush with a surface of a suspended ceiling, in accordance with the embodiments of the invention.

FIG. 4 shows a partial cross-sectional view of an installed T-bar clip assembly 400, in accordance with the embodiments of the invention. The housing structure 302 is coupled to the support bracket 301 that is attached to the T-bar structure 401 and is preferably attached to the T-bar structure 401 such that the support bracket 301 is vertically positioned and substantially parallel with the vertical support 405 of the T-bar structure 401. The housing structure 302 and the support bracket 301 form the junction box enclosure 411 that provides at least one power feed 409 with power lines to power an electrical fixture, such as described in detail above. Preferably, the power feed 409 exits the junction box enclosure 411 at a location at a bottom portion 413 of the junction box enclosure 411, wherein the location is substantially even with or flush with the outer surface 415 of a removable ceiling tile 409, a horizontal support flange 407 of the T-bar structure 401 or both. As described above, the T-bar clip assembly 400 is configured to couple to a fixture hardware kit that can include a canopy structure 304, for covering exposed portions of the T-bar clip assembly 400, and a sleeve structure 307, for receiving power lines from the power feed 409, exiting the bottom portion 413 of the junction box enclosure 411.

Figure 5:
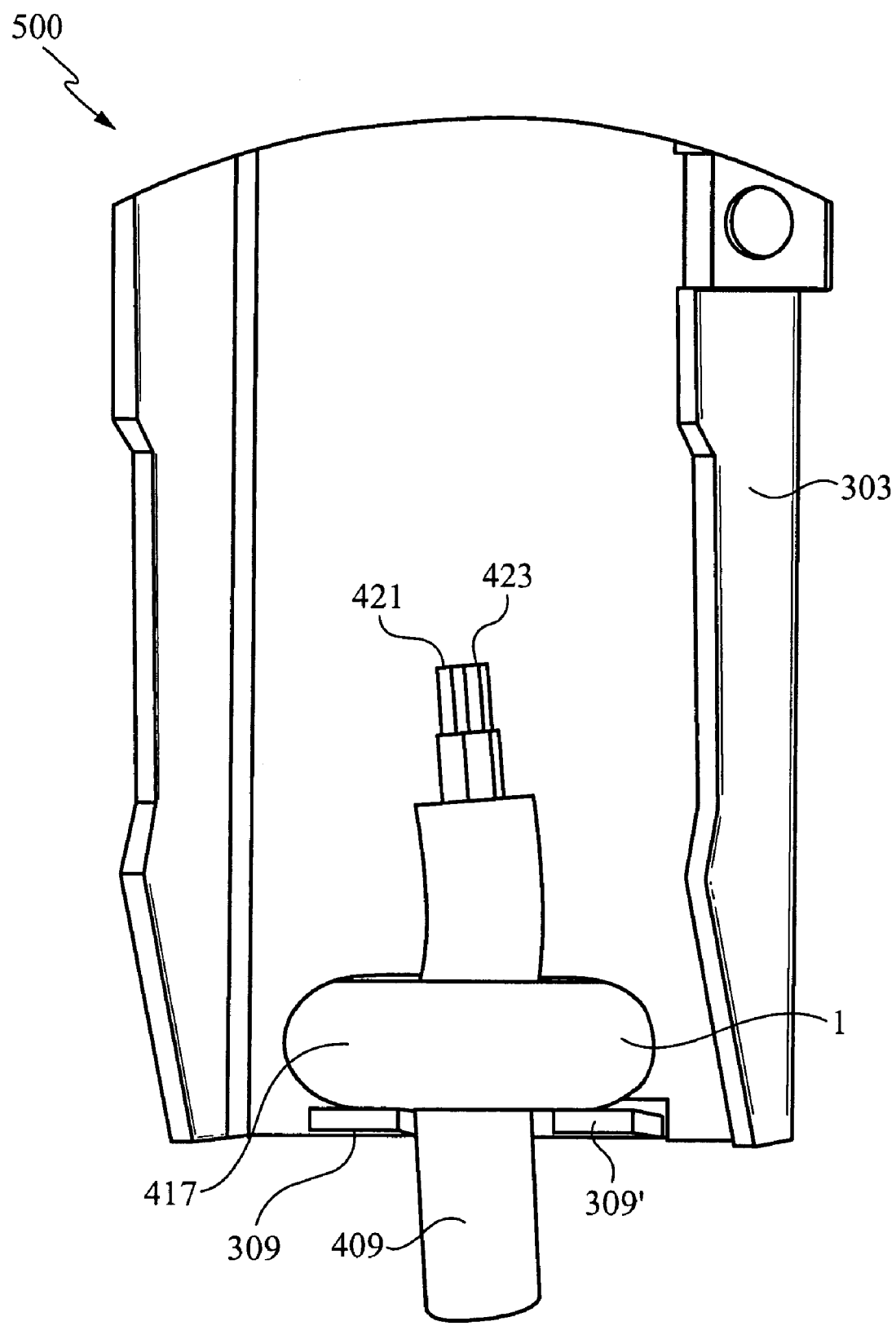
FIG. 5 is a schematic of power lines supported within a T-bar clip assembly, in accordance with the embodiments of the present invention.

FIG. 5 shows a perspective view 500 of a housing structure 303, in accordance with the embodiments of the invention. Like-numbered elements in FIGS. 5 and 3 refer to similar elements. The housing structure 303 includes power feed support flanges 309 and 309' to support a power feed line 409 with power wires 421 and 423 contained therein. The power feed line 409 can be supported by the power feed support flanges 309 and 309' with a grommet structure 417, a knot or any other structure that helps prevent the power feed line 409 from being pulled through the support flanges 309 and 309'.

FIG. 6 shows a perspective view of a T-bar clip assembly 600 coupled to a T-bar clip structure 401, in accordance with further embodiments of the invention. Again, like-numbered elements in FIGS. 6 and 3 refer to similar elements. The T-bar clip assembly 600 includes a first housing structure 302 and a second housing structure 302' that are configured to be coupled to a vertical housing support 350. The vertical housing support 350 can be formed form a first housing support bracket 301 and a second housing support bracket 303, wherein the first housing structure 302 and the first housing support bracket 301 form a first junction box enclosure 411 and the second housing structure 302' and the second housing support bracket 303 form a second junction box enclosure 411'. Each of the first junction box enclosure 411 and the second junction box enclosure 411' is configured to couple to conduits 403 and 403' through top portions 311 and 311' of the junction box enclosures 411 and 411', respectively. As described above the top portions 311 and 311' of the junction box enclosures 411 and 411' can be formed from flange structures that extend outward from the first housing support structure 301 and the second housing support structure 303, respectively. Each of the junction box enclosures 411 and 411' provide power-feed location through bottom portions of the junction box enclosure 411 and 411', as described above. Preferably, the power feed locations are even with or flush with an outer surface of a removable ceiling tile, a horizontal support flange 407 of the T-bar structure 401 or both. The T-bar clip assembly 600 is configured to couple to multiple electrical fixtures through an electrical fixture hardware kit 339' that can include a canopy 304, for covering exposed portions of the T-bar clip assembly 600, sleeves 307 and 307', for receiving power lines from power feeds exiting the junction box enclosures 411 and 411', and a bushing structure 305 with a support wire 306 for coupling to the T-bar clip assembly 600 and supporting the weight-bearing load of electrical fixtures attached thereto. Also, the T-bar clip assembly 600 can be coupled to a wire support 402 that is attached to a building structure.

Figure 7:
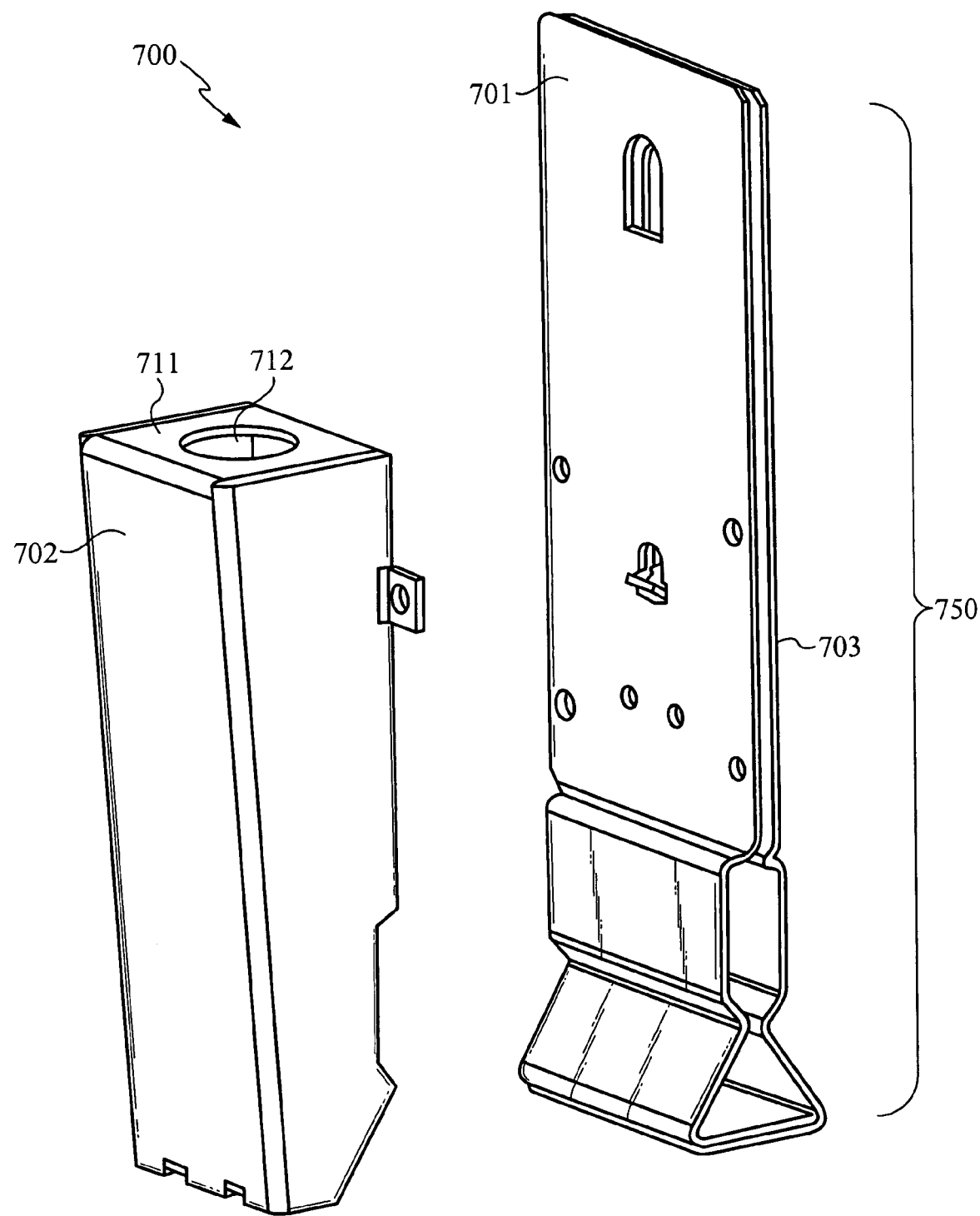
FIG. 7 shows a perspective view of a T-bar clip assembly, in accordance with further embodiments of the invention.

FIG. 7 shows a T-bar clip assembly 700, in accordance with further embodiments of the invention. The T-bar clip assembly 700, includes a first housing support structure 701 and a second housing support structure 703 that are configured to secure around a T-bar structure (not shown) and provide a vertical housing support structure 750, such as described above. The T-bar clip assembly 700 also includes a housing structure 702 configured to couple to the vertical housing support structure 750 through any suitable means and form a junction box enclosure. The junction box enclosure is configured for providing one or more power feeds that exit the junction box enclosure at a position that is even with or flush with a suspended ceiling (i.e. a T-bar structure and/or removable ceiling tile.) A housing structure 702 preferably includes a top portion 711 with an aperture 712 configured to couple to conduit, which provides power lines into the junction box enclosure.

Figure 8:
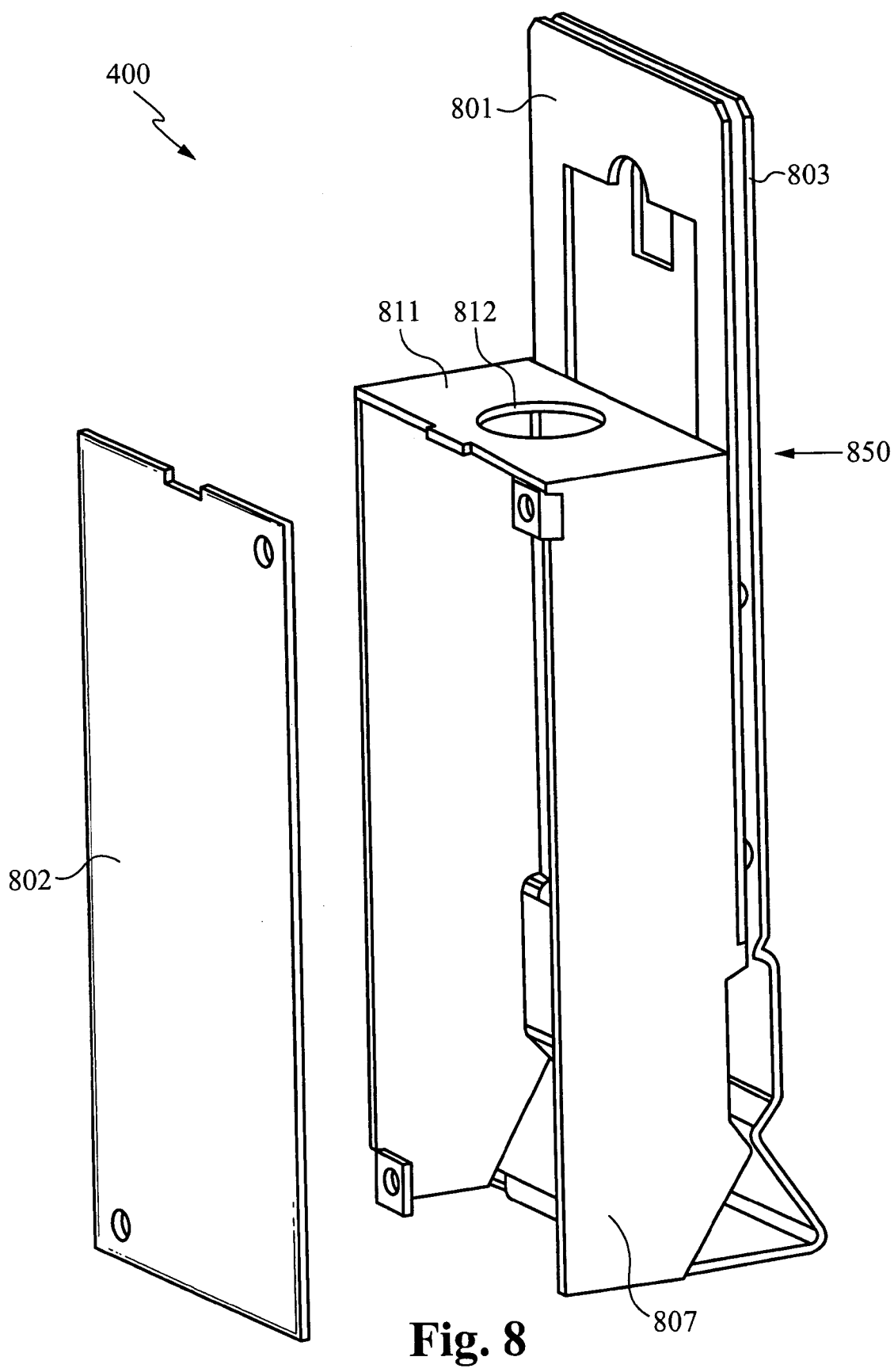
FIG. 8 shows a perspective view of a T-bar clip assembly, in accordance with yet further embodiments of the invention.

FIG. 8 shows a T-bar clip 800, in accordance with yet further embodiments of the invention. The T-bar clip assembly 800 includes a first housing support structure 801 and a second housing support structure 803 that are configured to secure around a T-bar structure (not shown) and provide a vertical housing support structure 850, such as described above. The T-bar clip assembly 800 also includes a housing plate 802 configured to attach to an integral housing structure 807 of the first housing support structure 801 and form a junction box enclosure. The junction box enclosure is configured for providing one or more power feeds that exit the junction box enclosure at a location that is even with or flush with a suspended ceiling. The integral housing structure 807 preferably includes a top portion 811 with an aperture 812 configured to couple to a conduit that provides power lines into the junction box enclosure.

Figure 9:
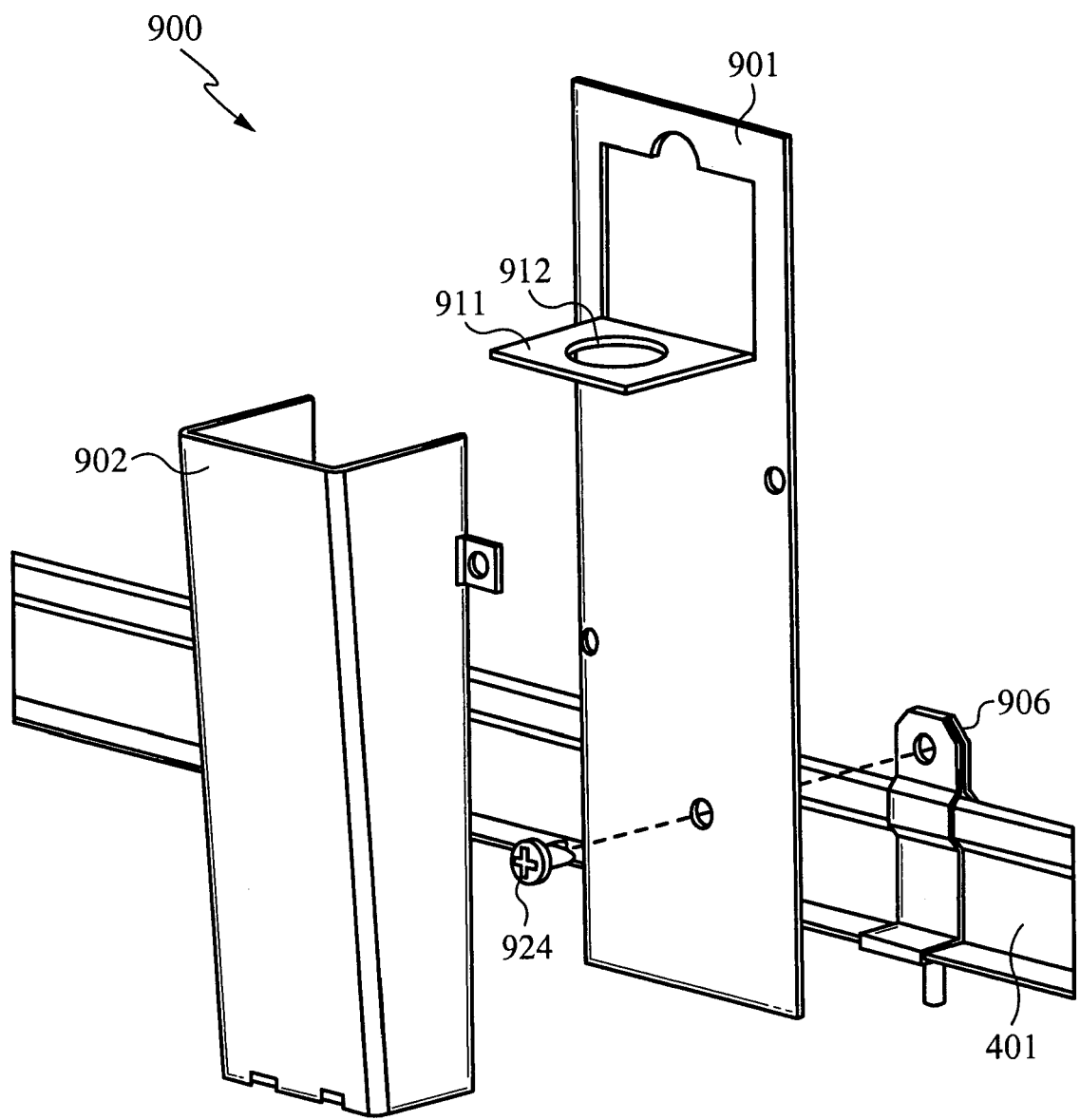
FIG. 9 shows a perspective view of a T-bar clip assembly, in accordance with yet further embodiments of the invention.

FIG. 9 shows a T-bar clip assembly 900, in accordance with still further embodiments of the invention. Again, like-numbered elements in FIGS. 8 and 3 refer to similar elements. The T-bar clip assembly 900, includes housing support structure 901 and a T-bar clip feature 906 configured to secure around the T-bar structure 401. The housing support structure 901 is coupled to the T-bar clip feature 906 to form a vertical housing support structure. The housing support structure 901 is coupled to the T-bar clip feature 906 through a screw 924 or any other suitable attachment feature including, but not limited to, clips, nuts and bolts, other geometric mating features and any combination thereof. The T-bar clip assembly 900 also includes a housing structure 902 configured to couple to the housing support structure 901 and form a junction box enclosure. The junction box enclosure is configured to provide one or more power feeds even with or flush with a suspended ceiling. The housing support structure 901 can include a flange 911 that forms a top portion of the junction box enclosure with the housing structure 902 coupled to the housing support structure 901. The flange 911 can include an aperture 912 configured to couple to the conduit that provides power lines into the junction box enclosure.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A clip assembly comprising:
    a) support brackets for securing around a T-bar structure of a suspended ceiling grid; and b) a housing structure for coupling to at least one of the support brackets and thereby forming a recessed junction box enclosure located above the suspended ceiling grid for supporting electrical connections and providing a power feed through a bottom portion of the recessed junction box enclosure, wherein the bottom portion of the recessed junction box enclosure is substantially flush with support flanges of the T-bar structure.

2. The clip assembly of claim 1, wherein the housing structure includes a receiving aperture for coupling to a conduit.

3. The clip assembly of claim 1, wherein, the housing structure includes power feed support flanges to support power feed wires.

4. The clip assembly of claim 1, wherein the housing structure includes mounting tabs for coupling to at least one of the support brackets.

5. The clip assembly of claim 1, wherein at least one of the bracket structures includes a canopy stud for securing to an electrical fixture.

6. The clip assembly of claim 1, wherein the support brackets include means for securing to a building support.

7. An electrical junction assembly comprising:
a) a vertical housing support that securely couples to a T-bar structure of a suspended ceiling grid; and
c) a housing structure configured to attach to the vertical housing support and form a junction box enclosure with the vertical housing support, wherein a bottom portion of the junction box enclosure has a power feed outlet substantially even with support flanges of the T-bar structure.

8. The electrical junction assembly of claim 7, wherein the vertical housing support is formed from a first support bracket and a second support bracket that secure around the T-bar structure of the suspended ceiling grid.

9. The electrical junction assembly of claim 7, wherein the housing structure includes a receiving aperture for coupling to conduit.

10. The electrical junction assembly of claim 7, wherein the housing structure includes power feed support flanges to support power feed wires.

11. The electrical junction assembly of claim 7, wherein the housing structure includes mounting tabs for coupling to the vertical housing support.

12. The electrical junction assembly of claim 7, wherein the vertical housing support includes means for attaching and supporting an electrical fixture.

13. The electrical junction assembly of claim 7, wherein the vertical housing support includes means for securing a building support.

14. A T-bar clip assembly comprising:
a) support brackets configured to secure around a T-bar structure of a suspended ceiling grid to thereby form a vertical housing support; and
b) a housing structure configured to couple to the vertical housing support and thereby form a recessed junction box enclosure that provides locations for splices and electrical service connections to electrically couple an electrical fixture to a power line, wherein the recessed junction box enclosure includes at least one power feed location at a bottom portion of the recessed junction box enclosure, wherein the bottom portion of the recessed junction box enclosure is substantially flush with support flanges of the T-bar structure.

15. The T-bar clip assembly of claim 14, wherein the support brackets include means for aligning and securing the support brackets together while positioned around the T-bar structure.

16. The T-bar clip assembly of claim 14, wherein the support brackets comprises one or more flange tabs that form portions of the recessed junction box enclosure.

17. The clip assembly of claim 1, wherein the at least one of the support brackets comprises a flange tab that forms a top portion of the junction box enclosure.

18. The clip assembly of claim 17, wherein the flange tab includes a receiving aperture for coupling to a conduit.

19. The electrical junction assembly of claim 7, wherein the vertical housing support comprises a flange tab that forms a top portion of the junction box enclosure.

20. The electrical junction assembly of claim 19, wherein the flange tab includes a receiving aperture for coupling to a conduit.

* * * * *